Nov. 26, 1929.   W. H. PARKER ET AL   1,736,981
LIQUID DISPENSING MECHANISM
Filed Feb. 17, 1926
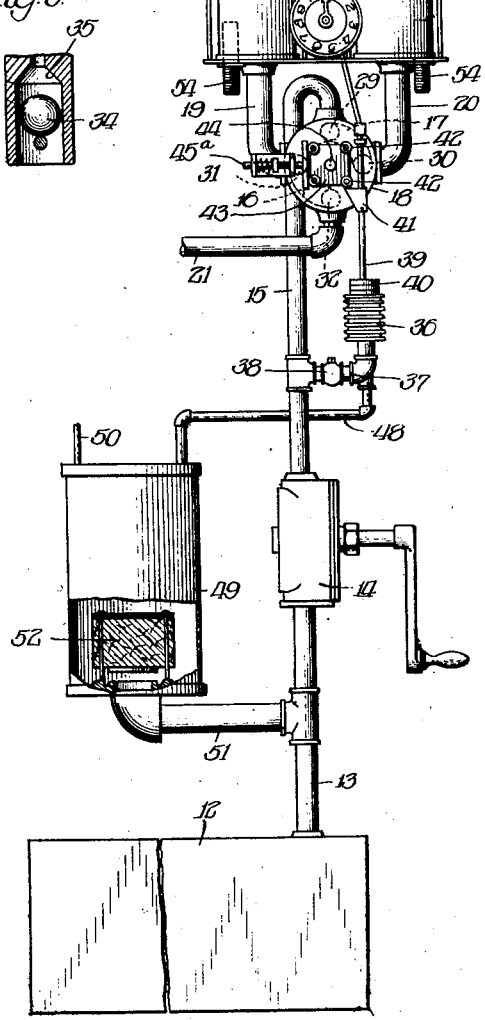
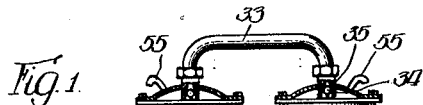
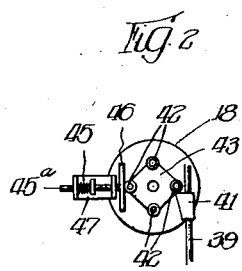
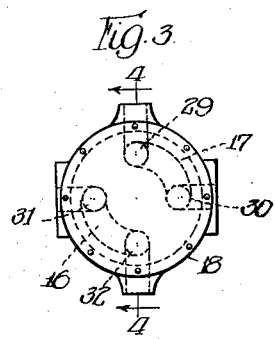
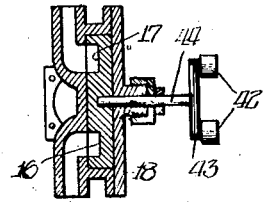
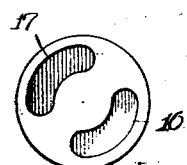
Inventors:
Walter H. Parker
Frederick W. Delanoy,
By Wilkinson, Huxley, Byron & Knight
Attys.
Witness:
R. Burkhardt Patented Nov. 26, 1929

1,736,981

UNITED STATES PATENT OFFICE

WALTER H. PARKER AND FREDERICK W. DELANOY, OF ROCHESTER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

LIQUID-DISPENSING MECHANISM

Application filed February 17, 1926. Serial No. 88,771.

This invention relates to liquid dispensing mechanism.

One object of the invention is to provide simple, reliable and efficient liquid dispensing apparatus which will permit a continuous flow of liquid to be measured and dispensed, thereby reducing to a minimum the time required for supplying a motor vehicle.

Another object is to provide apparatus of the above mentioned type in which liquid is accurately measured and dispensed.

Another object is to provide apparatus of the type indicated in which the various parts of the apparatus are timed and controlled to secure accurate measurement of liquid and facilitate the dispensing thereof.

Another object is to alternately supply to each of a plurality of measuring chambers a predetermined amount of liquid, any excess of supplied liquid being diverted in a controlled manner and being effective as a result of liquid pressure developed to actuate a reversible valve for controlling the supply of liquid to and discharge of liquid from the measuring chambers.

Another object is to control the various parts of the apparatus and the flow of liquid in a manner to meet all of the requirements for successful commercial use.

These and other objects are accomplished by means of the arrangement disclosed on the accompanying sheet of drawings, in which Figure 1 is a vertical longitudinal sectional view, parts being in section, of liquid dispensing apparatus embodying our invention;

Figure 2 is a detailed view showing the actuating mechanism for the reversible valve;

Figure 3 is a front elevation on an enlarged scale of the reversible valve;

Figure 4 is a vertical sectional view of the reversible valve taken in the plane of line 4—4 of Figure 3;

Figure 5 is a detailed front elevation of the rotary valve member; and

Figure 6 is a fragmentary enlarged view of the air connection between the measuring chambers and showing one of the float valves.

The various novel features of the invention will be apparent from the following description and drawings and will be particularly pointed out in the appended claims.

Referring to the figures of the drawings in which the apparatus is shown somewhat diagrammatically, it will be noted that the invention is illustrated in connection with continuous flow liquid dispensing apparatus including two preferably transparent measuring chambers or containers 10 and 11 into which liquid is forced from any suitable source represented by the liquid storage tank 12, the liquid being drawn therefrom, in this instance, through a pipe 13 by a pump 14 and then forced through a pipe 15 alternately through passages 16 and 17 in valve 18 and respectively through pipes 19 and 20 into said measuring chambers 10 and 11 respectively. After the liquid is measured within the measuring chambers 10 and 11, it is discharged alternately from said chambers through the same pipes 19 and 20 and through passageways in valve 18 and out through the dispensing or service pipe 21 to which a hose or the like may be connected.

As shown in Figures 1 and 3 of the drawings, liquid is being pumped from the supply pipe through a valve port 29, valve arcuate passageway 17, valve port 30 and pipe 20 into measuring chamber 11. At the same time, liquid which has been measured in the measuring chamber 10 is passed downwardly and outwardly through pipe 19, valve port 31, valve arcuate passageway 16, valve port 32 and out through dispensing pipe 21. As liquid rises in the measuring chamber 11, air is forced by said rising liquid from the upper part of said chamber through an air pipe 33 into the upper part of the other measuring chamber 10. Air will continue to be transferred from chamber 11 to chamber 10 until the liquid rises up into engagement with and presses a float valve 34 into closed position against its seat 35. When the float valve 34 closes, the supply of liquid to the measuring chamber ceases, but it is to be understood that the pump continues in operation to supply an excess amount of liquid. As a result thereof, liquid pressure is built up in the supply pipe 15. In the arrangement shown, we take advantage of this built up liquid pressure for actuating the reversible valve 18 from one of its operative positions to another one of its operative positions.

In this connection, it will be noted that a sylphon bellows 36 is provided and intermediate the pump 14 and valve 18 is connected to the supply pipe by a pipe connection 37 including a check valve 38. The sylphon bellows has an operating rod 39 which is provided with a predetermined number of weights 40 by means of which the sylphon bellows is prevented from expanding until a certain predetermined pressure is built up in the supply pipe 15, which pressure can be developed only after either one or the other of the measuring chambers 10 or 11 is completely filled. Mounted on the operating rod 39 is a pawl 41 which is adapted to successively engage rollers or projections 42 carried by a plate 43 which is secured to the shaft 44 of the reversible valve 18.

Under the conditions imposed, that is, with liquid being supplied to measuring chamber 11 and liquid discharging from measuring chamber 10, let it be assumed that measuring chamber 11 has been completely filled and that the pump 14 continues in operation. As a result thereof, liquid pressure is built up in the supply pipe 15 and extends to the sylphon bellows 36 for expanding same and raising the rod 39, which, through the pawl 41 and one of the projections 42, causes the control valve 18 to be rotated through an angle of ninety degrees thereby reversing the connections so that liquid is then supplied to the measuring chamber 10 while liquid is being discharged from the measuring chamber 11. In rotating the control valve 18, after it has been rotated through an angle of slightly over forty-five degrees or slightly past the position shown in Figure 2, said valve is snapped into this ninety degrees position due to the action of a coil spring 45 which is coiled around a stem 45ª to which a plate 46 is secured, the latter being in direct engagement with one or more of the projections 42 as the case may be. As shown in Figure 2, the plate engages but a single projection 42. However, when the valve 18 is in operative position for permitting the passage of liquid therethrough, the plate 46 engages two of the projections 42 as shown in Figure 1. The spring pressed plate therefore acts as a yieldable lock for locking the reversible valve in operative position. The plate 46 and its rod 45ª may be supported in any suitable bracket 47.

While the excess pumped liquid is permitted to flow from the supply pipe 15 to the sylphon bellows 36 past the check valve 38, such liquid cannot return to the supply pipe past the check valve. However, the excess pumped liquid which passes the check valve 38 finally escapes through a relatively small pipe 48 which leads to an excess flow receptacle 49 having a vent 50. The pipe 48 while it is relatively small to prevent a too rapid escape of the liquid is large enough to drain the sylphon bellows 36 at the proper time. Liquid is returned to the supply line 13 from the excess flow receptacle 49 through a pipe 51, it being understood that the excess flow receptacle is provided with a float valve 52 which controls the flow of liquid from the receptacle 49. Providing the by-pass connected to the sylphon 36 with the device 49 prevents pumping of the liquid from the discharge side of the pump 14 to the supply side of the pump 14, insuring supply of the liquid to the measuring cylinders. This is so because the liquid draining through the drain or receptacle 49 is retained in the receptacle 49 until enough liquid is supplied thereto to raise the float valve 52 to thereby permit the liquid to drain into the pipe 13. Not all of the liquid is drained, as will be understood, for as soon as the liquid is diminished whereby the weight of the float valve overcomes the buoyancy, the valve will seat to cut off the flow of liquid through the pipe 51 so that no suction is exerted on the check valve 38. Indicating mechanism 53 may be operatively connected to the reversing valve in any desired manner to indicate the number of gallons measured. Calibrating plugs 54 are shown for calibrating the chambers 10 and 11. Suitable vent control connections 55 are provided at the upper end of each of the measuring chambers 10 and 11 to connect the interior of said chambers to the atmosphere when it is desired to empty said measuring chambers when the other of said chambers is not being filled.

By means of this arrangement accurate measurement of liquid is guaranteed because in each instance the measuring chamber is completely filled. After each chamber is filled, the pump continuing to operate, an excess quantity of liquid is forced into the supply pipe for building up a back pressure or a liquid pressure which is passed into the sylphon bellows for directly actuating the control valve for changing the supply and discharge connections to the measuring chambers. The excess flow liquid may be said to be by-passed with respect to the supply pipe, one connection of the by-pass being to the supply pipe above the pump 14 and the other connection to the supply pipe below the pump.

It is our intention to cover all modifications of the invention falling within the spirit and scope of the following claims:

We claim:
1. In liquid dispensing apparatus, the combination of a measuring container, a liquid supply pipe through which liquid is supplied thereto, a valve for controlling the supply of liquid to said container, a branch pipe extending from said supply pipe, and reciprocating means responsive to liquid pressure developed in said supply and branch pipes for positively actuating said valve.

2. In liquid dispensing apparatus, the combination of a measuring container, a supply pipe through which liquid is supplied thereto, a valve for controlling the supply of liquid to said container, a pump for pumping liquid through said supply pipe to said container, and reciprocating means intermediate said pump and valve and connected to said supply pipe responsive to fluid pressure developed in said supply pipe for positively operating said control valve.

3. In liquid dispensing apparatus, the combination of a measuring container, a pipe through which liquid is supplied thereto, a valve for controlling the supply of liquid to said container, a pump for pumping liquid through said supply pipe to said container, and reciprocating means located between said pump and valve and operatively connected to the latter responsive to liquid pressure developed in said supply pipe for positively actuating said valve.

4. In liquid dispensing apparatus, the combination of a measuring container, means for supplying liquid thereto, means for controlling the supply of liquid to said container, and expansible means responsive to liquid pressure for positively actuating said controlling means, said last named means having a portion successively engaging portions of said controlling means for operation of the latter.

5. In liquid dispensing apparatus, the combination of a measuring container, a supply pipe through which liquid is supplied to said container, means for controlling the supply of liquid to said container, an expansible bellows responsive to liquid pressure developed in said supply pipe for positively actuating said controlling means, and means for relieving the liquid pressure developed in said expansible bellows and means independent of said expansible means and cooperating with said controlling means for positively holding said controlling means in selected positions for supplying liquid to said container.

6. In liquid dispensing apparatus, the combination of a measuring container, a supply pipe through which liquid is supplied to said container, means for controlling the supply of liquid to said container, an expansible bellows responsive to liquid pressure developed in said supply pipe for positively actuating said controlling means, and a draw-off connection for said expansible bellows to relieve pressure developed therein, said draw-off having means therein for preventing forced diverting of liquid from said bellows.

7. In liquid dispensing apparatus, the combination of a measuring container, means for supplying liquid thereto, means for controlling the supply of liquid to said container, a by-pass around a portion of said means for supplying liquid, and means associated with said by-pass responsive to liquid pressure developed in the supply means and by-pass for positively actuating said controlling means and means in said by-pass for preventing forced diverting of liquid through said by-pass.

8. In liquid dispensing apparatus, the combination of a measuring container, means including a main supply pipe for supplying liquid thereto, means for controlling the supply of liquid to said container, fluid conducting means branching from said main supply pipe, means whereby when said measuring container has received a predetermined amount of liquid, any excess amount of liquid will be diverted in said branch fluid conducting means, and means in said branch fluid conducting means responsive to liquid pressure resulting from excess supply of liquid for positively actuating said controlling means.

9. In liquid dispensing apparatus, the combination of a plurality of measuring containers, means for supplying liquid thereto, a valve for controlling the supply of liquid alternately to said container, and means on the supply side of said valve responsive to liquid pressure for positively actuating said valve.

10. In liquid dispensing apparatus, the combination of a plurality of measuring containers, means for supplying liquid thereto, a valve for controlling the supply of liquid to and the discharge of liquid from said containers, an excess flow connection to said liquid supply means, and means responsive to liquid pressure developed in said supply means and excess flow connection for positively actuating said valve.

11. In liquid dispensing apparatus, the combination of a plurality of measuring containers, a supply pipe through which liquid is supplied to said containers, a reversible valve for controlling the supply of liquid to said containers, a pump for forcing liquid through said pipe, a by-pass connection around a portion of said supply pipe and connected thereto on opposite sides of said pump whereby excess pumped liquid will be forced from said supply pipe on one side of said pump and returned directly to said supply pipe on the other side of said pump, and means responsive to liquid pressure in said by-pass connection for positively actuating said reversible valve.

12. In liquid dispensing apparatus, the combination of a measuring container, means for supplying liquid thereto, means for controlling the supply of liquid to said container, expansible means responsive to liquid pressure for positively actuating said controlling means, and means independent of said expansible means and associated with said second named means for releasably locking said controlling means in a given position.

13. In liquid dispensing apparatus, the combination of a measuring container, means for supplying liquid thereto, a control valve for controlling the supply of liquid to said container, expansible means responsive to liquid pressure for positively actuating said valve, and means associated with said second named means for releasably locking said valve in a given position.

14. In liquid dispensing apparatus, the combination of a plurality of measuring containers, supply means for supplying liquid thereto, a discharge connection, control means for controlling alternate supply to one of said containers and connection from the other of said containers to said discharge connection, means for yieldingly and positively controlling the operating positions of said control means, a by-pass connection around said supply means having a device therein for preventing suction of liquid from the delivery side of said supply means by said supply means, and reciprocating means disposed in said by-pass connection and operated by the back pressure caused by filling of one of said containers for positively operating said control means whereby the filled container is connected to said discharge connection and the other container is connected to said supply means.

15. In liquid dispensing apparatus, the combination of a plurality of measuring containers, supply means for supplying liquid thereto, a discharge connection, control means for controlling alternate supply to one of said containers and connection from the other of said containers to said discharge connection, means for yieldingly and positively controlling the operating positions of said control means, a by-pass connection around said supply means, and a member in operating contact with said control means and operated by the back pressure caused by filling of one of said containers for positively operating said control means whereby the filled container is connected to said discharge connection and the other container is connected to said supply means.

Signed at Rochester, Pennsylvania this 11th day of February, 1924.

WALTER H. PARKER.
FREDERICK W. DELANOY.